INVENTOR.
CLARENCE J. GLANZER

Nov. 18, 1952 — C. J. GLANZER — 2,618,289
RELIEF VALVE FOR AIR FILTERS
Filed Jan. 20, 1950 — 2 SHEETS—SHEET 2

INVENTOR.
CLARENCE J. GLANZER
BY
Hyde, Meyer, Baldwin & Doran
ATTORNEYS

Patented Nov. 18, 1952

2,618,289

UNITED STATES PATENT OFFICE 2,618,289

RELIEF VALVE FOR AIR FILTERS

Clarence J. Glanzer, Northfield, Ohio, assignor to Air-Maze Corporation, Cleveland, Ohio, a corporation of Delaware Application January 20, 1950, Serial No. 139,578

5 Claims. (Cl. 137—493)

This invention relates to a relief valve means where sudden changes from suction to pressure occur in a conduit connection and wherein it is desired to quickly relieve a pressure condition in the conduit connection, and at the same time to positively prevent the transmission of the pressure beyond the relief device.

One of the applications of the present invention occurs in connection with an air filter of the liquid-washed type as applied to the suction pipe of an air compressor of the free-unloading type. When a filter is connected in this fashion and the compressor is unloaded (particularly at higher speeds), there is a sudden rush of air under pressure upstream of the inlet pipe, and this generally blows the liquid out of the liquid-washed filter.

Another application of the invention would occur where an air cleaning filter of the liquid-washed type was applied to the air inlet of an internal combustion engine. When a backfire occurs in the engine, there is a tendency to blow the liquid out of the filter.

In the above mentioned illustrative examples of the application of my invention, it is desirable to relieve the pressure in the inlet pipe (which is normally subject to suction) the moment the pressure occurs. At the same time, it is desirable to prevent the transmission of the pressure to the filter so as to prevent any spilling or blowing out of the liquid from the filter. The present invention is adapted to accomplish these purposes.

Other objects and advantages of my invention will be apparent from the accompanying description and drawings, and the essential features thereof will be set forth in the appended claims.

In the drawings—

Fig. 2 is a view similar to the lower portion of Fig. 1 but showing the parts in another position; while

Figure 1:
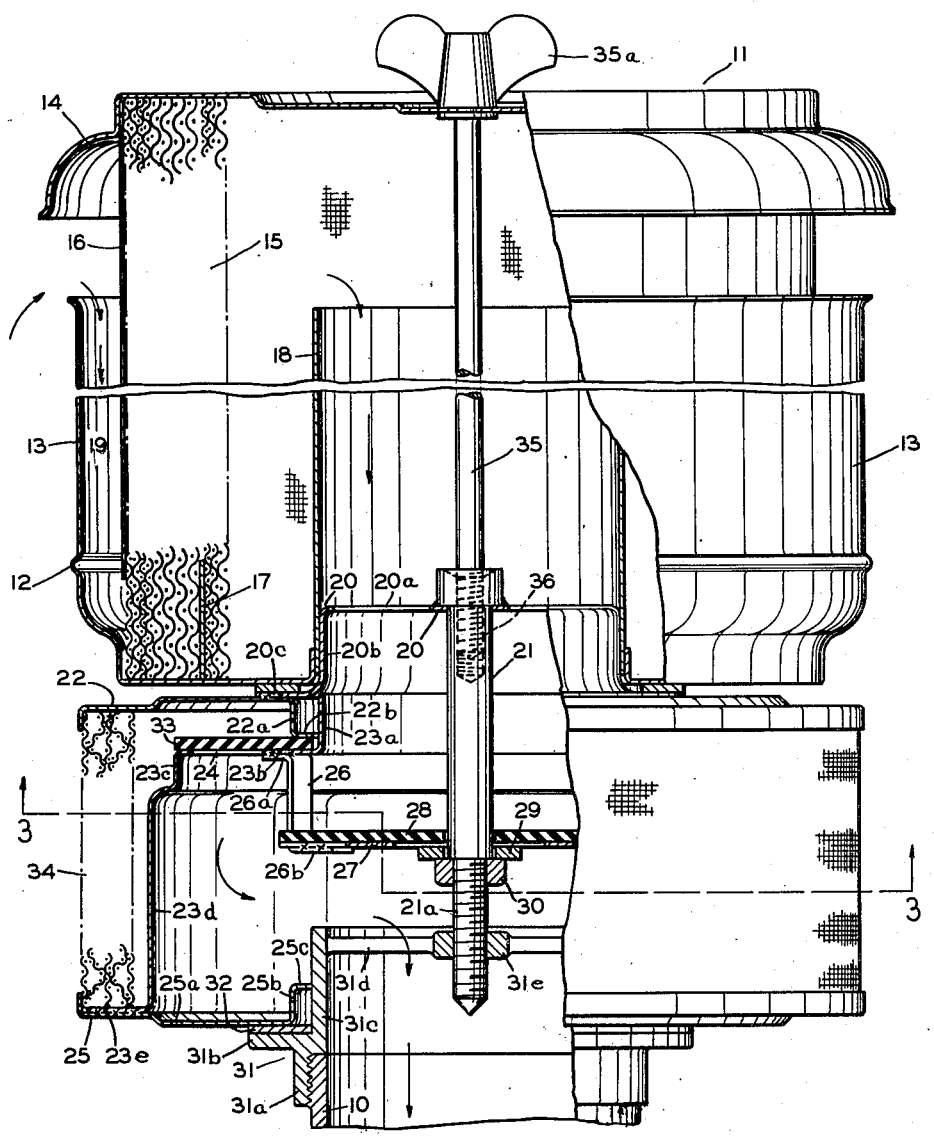
Fig. 1 is a side elevational view partly broken away in central section showing a liquid-washed air filter in combination with my improved relief valve means.
Figure 2:
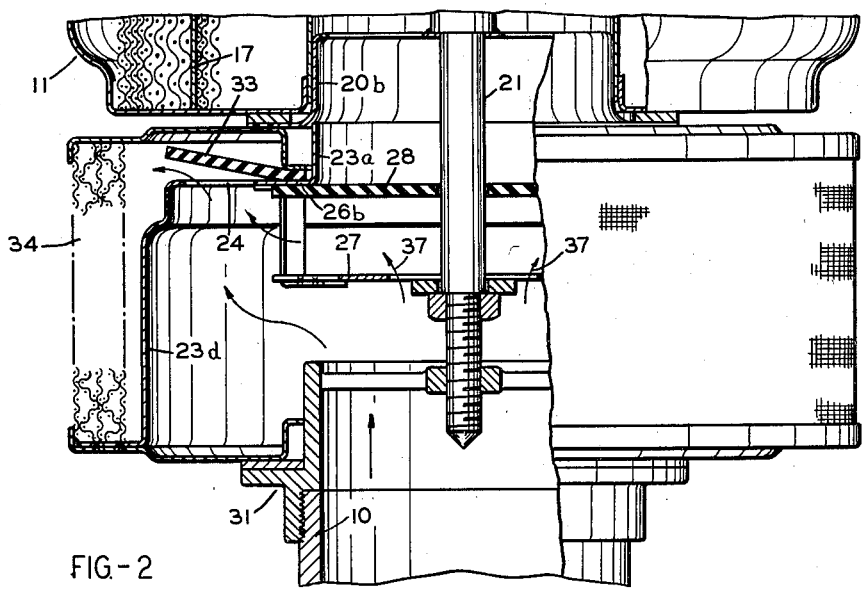

In the embodiment of my invention chosen for illustration in Figs. 1 and 2, I have shown the conduit connection 10 which is the inlet pipe for an air compressor of the free-unloading type. The filter 11 is for the purpose of cleaning the air normally sucked through the connection 10 to the compressor. I have chosen to illustrate a filter of a known type for coaction with my improved relief valve means, but it should be understood that many other types of filters might be used in the same location and my invention is useful therewith insofar as it prevents the spilling or blowing of liquid out of the liquid bath of the filter. The type of filter illustrated is filled with a liquid such as oil up to the level of the bead 12 which, when no air is flowing, fills the bowl 13 from outer wall to outer wall up to this level with an air washing bath. The cover member 14 carries an annular filter element 15 which may be composed of foraminous material such as wire mesh screen of a known type. Radially outside of the screen filtering element 15 is a skirt 16 which depends downwardly from the cover member to a level just slightly below the bead 12. It should be understood that the outermost layers of the filter element 15 are of very coarse material so that the entering air stream intermixed with the oil from the bath is carried upwardly inside of the skirt 16 and evenly distributed over the filter element. To provide a seal, a strip of air impervious material 17 extending in a cylindrical form entirely around the filter element 15 is provided near the bottom between layers of the screen material of the filter element. Centrally of the bowl 13 there is provided a cylindrical outlet pipe 18. In the normal use of the filter, air entering the filter inlet between the covers 14 and bowl 13, flows in the direction of the arrows down through the chamber 19, then beneath the surface of the oil, carrying oil with it to wash the filter element 15. The air passes above the baffle 17 and through the central portion of the filter to the upper end of tube 18 and then downwardly toward the outlet. Usually oil returns from the chamber radially inwardly of baffle 17 to the chamber radially outwardly therefrom either through openings in the baffle 17 or by trickling over the top thereof. Such filter action is well known. It is obvious that in apparatus of this kind, upon the occurrence of a sudden pressure in the conduit connection 10, air will flow in a direction reverse to the arrows indicated in Fig. 1 and will blow oil or other liquid from the bath in the bottom of bowl 13 upwardly through the chamber 19 and out to the atmosphere. It is the purpose of my invention to prevent this.

Figure 3:
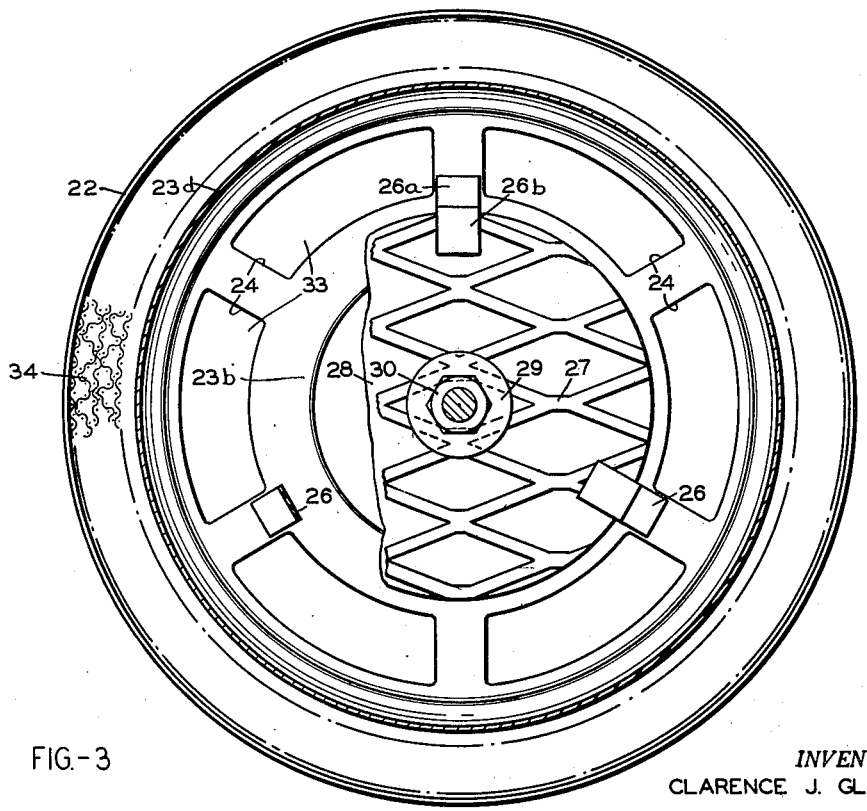
Fig. 3 is a transverse sectional view taken generally along the line 3—3 of Fig. 1.

Between the conduit connection 10 and the filter (more particularly the outlet conduit 18 of the filter) I place my improved pressure relief device. In the form here shown, this comprises a spider 20 having radial arms 20a and a central opening through which passes a bolt 21, the head of which is secured as by welding to the center of the spider 20. The spider has a cylindrical side wall 20b adapted to telescopically enter the lower end of the tube discharge member 18. Below the cylindrical wall 20b, an imperforate flange 20c extends radially outwardly. Secured to the flange 20c, as by spot welding, is a top housing cover member 22. This member is annular in form and, near its inner edge, bends downwardly at 22a and then radially inwardly at 22b providing a central opening of approximately the same diameter as the inside opening of tube 18. A lower subassembly is provided with an upstanding central cylindrical nose 23a which extends inside of the opening of flange 22b. The same plate member of the lower subassembly then extends radially outwardly as indicated at 23b for a distance a little more than one-fifth of the diameter of the relief valve member. The same plate member then bends downwardly for a short distance as indicated at 23c and then a slight shoulder outwardly connects the same with a further downwardly extending imperforate member 23d, the bottom end of which terminates in a flange 23e extending radially outwardly. A plurality of openings 24 is provided through the plate portion 23b as clearly shown in Figs. 1 and 3. Secured to the flange 23e is a bottom housing cover 25 of annular form secured to the plate member 23e as by spot welding. This housing member extends inwardly as indicated at 25a, then upwardly as indicated at 25b and finally radially inwardly as indicated at 25c, leaving a central circular opening. Three depending legs 26 of Z-form have their upper flanges 26a secured as by spot welding to the plate portion 23b and have their lower flanges 26b secured as by spot welding to a plate of expanded metal 27 or similar stiff foraminous material. An annular flexible valve 28 of rubberlike material lies on top of the expanded metal plate 27 and is provided with a central opening to receive the bolt 21. A washer 29 and a nut 30 threaded on the lower end of bolt 21 of smaller diameter and threaded as indicated at 21a holds the parts assembled on bolt 21.

For mounting all of the parts on the pipe or conduit 10, I provide a special fitting 31 having a lower threaded sleeve 31a having a threaded connection with the conduit 10. A flange 31b extends radially outwardly for the purpose of holding a gasket 32 between the member 31 and the lower housing cover 25a. An upstanding central sleeve or nozzle 31c, of approximately the same diameter as tube 18, extends upwardly through the central opening internally of the flange 25c. A spider 31d is provided with a central hub 31e which carries a thread to receive the end 21a of bolt 21.

As the upper subassembly and the lower subassembly are secured together, an annular resilient rubberlike valve 33 is placed over the openings 24 so as to close the same, this valve extending from the shoulder 23c inwardly almost to the nozzle provided by the upstanding flange 23a. The inner periphery of this valve 33 is clamped between the flange 22b of the upper assembly and the plate portion 23b of the lower assembly as the two parts are drawn together. At the same time, a filter element 34 is clamped between the top and bottom housing members 22 and 25 respectively. This filter element is of annular nature and extends entirely around the relief valve device for the purpose of filtering dirt out of any air which may enter the device radially at this point. The filter 34 may be of any known type and is here shown as composed of several layers of screen mesh material.

The relief valve device and the filter are held together by means of a bolt 35 having a thumbscrew head 35a extending out the top of the filter. The lower end of bolt 35 is threaded and enters a threaded opening 36 at the upper end of bolt 21.

In the normal condition of the relief valve, as shown in Fig. 1, when the air is entering the compressor in the direction of the arrows of Fig. 1, the valve 33 covers the openings 24 and is held there by the suction in conduit 10. At the same time, the valve 28 covers the openings in the expanded metal plate 27 due to the downward rush of air through the device. Upon the occurrence of a sudden backflow of air, in the direction of the arrows of Fig. 2, such as occurs in the unloading of a compressor of the type described, the rush of air upwardly through the openings in the expanded metal and in the direction of the arrows 37 of Fig. 2 pushes upwardly on the valve 28 and carries the same to the positions shown in Fig. 2 where valve 28 is arrested by having its outer edges strike against the lower surface of plate portion 23b. This effectively shuts off any counter-flow of air through the tube 18 into the filter device and therefore no oil will be blown out of the oil bath of the filter. At the same time, the sudden air pressure beneath the valve 33 acting through the openings 24 lifts valve 33 to the positions shown in Fig. 2 giving free exit of the air outwardly through the filter element 34 to atmosphere. Thus my device operates effectively to positively block the backflow of air through the filter and at the same time provides easy exit of the air to the atmosphere, thus effectively relieving the pressure in the conduit 10. In actual practice, as well known to those in this art, the valve 33 will flutter according to the strokes of the compressor during the unloading cycle. However, all pressure in the conduit 10 will be relieved through the valve 33. It is the first sudden rush of air which must be taken care of as the compressor is unloaded and this effectively moves the valves 28 and 33 from the position of Fig. 1 to the position of Fig. 2 so as to effectively carry out the desired relief of pressure.

What I claim is:

1. A pressure fluid stream relief device comprising a housing adapted to be positioned in a gaseous stream and having a normal inlet located centrally of its top wall and having a normal outlet located centrally of its bottom wall, said relief device being subjected at times to back flow whereupon said normal outlet becomes an inlet, a nozzle at said normal outlet for directing a gaseous jet upwardly during back flow, a foraminous horizontally extending planar valve support spaced above said nozzle a short distance, said valve support having large through openings, a free planar check valve normally lying on top of said support, said check valve having width dimensions greater than said normal inlet, said normal inlet providing a downwardly presented valve seat against which said check valve is adapted to seat upwardly under influence of a gaseous jet from said nozzle during back flow, said housing forming a continuous conduit from said normal inlet to said normal outlet, there being a flat horizontally extending wall of said housing having relief openings through it, said last named wall being above and laterally outwardly from said check valve, a planar relief valve of flexible rubberlike material resting against said flat wall and normally closing said openings, the inner edge only of said relief valve being secured to said flat wall, and there being a passageway for free flow of the stream from said normal inlet to said normal outlet around the outer periphery of said check valve.

2. The combination of claim 1 wherein said housing includes an upper subassembly having a centrally located upstanding nose adapted to telescopingly enter a connecting tube, a spider across the upper end of said nose, an annular flange extending downwardly below said nose and having a diameter approximately equal to that of said normal inlet, a lower subassembly including said flat wall, said flat wall and relief valve being annular with an inside diameter approximately equal to that of said normal inlet, a rigid connection between said flat wall and said valve support, there being registering central openings through said valve support and said check valve, and a vertically positioned bolt secured between said spider and said valve support and clamping them together, whereby to hold said upper and lower subassemblies together, the inner periphery of said relief valve being held clamped between said annular flange (below said nose) and said flat wall.

3. The combination of claim 1 wherein said housing includes a vertical rod extending up from said check valve support into said normal inlet, said check valve having a hole loosely surrounding said rod whereby the upwardly directed jet will move said check valve along said rod into sealing engagement with said valve seat.

4. A pressure fluid stream relief device comprising a housing adapted to be positioned in a gaseous stream and having a normal inlet located centrally of its top wall and having a normal outlet located centrally of its bottom wall, said relief device being subjected at times to back flow whereupon said normal outlet becomes an inlet, a nozzle at said normal outlet for directing a gaseous jet upwardly during back flow, a foraminous horizontally extending planar valve support spaced above said nozzle a short distance, said valve support having large through openings, a free planar check valve normally lying on top of said support, said check valve having width dimensions greater than said normal inlet, said normal inlet providing a downwardly presented valve seat against which said check valve is adapted to seat upwardly under influence of a gaseous jet from said nozzle during back flow, said housing forming a continuous conduit from said normal inlet to said normal outlet, a wall of said housing having at least one relief opening through it, said last named wall being above and laterally outwardly from said check valve, a relief valve normally closing said opening but uncovering said opening during back flow, and there being a passageway for free flow of the stream from said normal inlet to said normal outlet around the periphery of said check valve.

5. The combination of claim 4 wherein said housing includes a vertical rod extending up from said check valve support into said normal inlet, said check valve having a hole loosely surrounding said rod whereby the upwardly directed jet will move said check valve along said rod into sealing engagement with said valve seat.

CLARENCE J. GLANZER.

REFERENCES CITED

The following references are of record in the file of this patent:

UNITED STATES PATENTS

| Number | Name | Date |
|---|---|---|
| 947,536 | Wenkel | Jan. 25, 1910 |
| 2,152,422 | Torheim | Mar. 28, 1939 |
| 2,196,287 | Baudette | Apr. 9, 1940 |